June 12, 1956    M. W. P. STRANDBERG    2,750,564
FREQUENCY MONITORING CIRCUIT
Filed Feb. 1, 1946

*INVENTOR.*
MALCOM W. P. STRANDBERG
BY
*M. C. Hayes*
ATTORNEY

United States Patent Office 2,750,564
Patented June 12, 1956

2,750,564

FREQUENCY MONITORING CIRCUIT

Malcom W. P. Strandberg, Cambridge, Mass., assignor, by mesne assignments, to the United States of America as represented by the Secretary of the Navy Application February 1, 1946, Serial No. 644,978

6 Claims. (Cl. 324—79)

This invention relates to apparatus for measuring the frequency of a radio signal and more particularly to spectrum analysis and frequency measurement of high frequency radio waves.

Previous methods of measuring the frequency of radio signals have included absorption wave meters and comparison with a signal whose frequency is known. Accurate measurement of high frequency radio waves by these methods has not heretofore been possible due to the difficulties encountered in constructing and calibrating measuring devices for high frequencies.

An object of this invention is to provide a simplified means of measuring the frequency of high frequency electro-magnetic waves employing a superheterodyne receiver.

Another object of this invention is to so adapt this means that the receiver tuning may be conveniently and periodically varied and the output magnitude of each component of an electromagnetic oscillation may be measured instantaneously.

It is a further object of this invention to provide a calibrated high Q cavity as a selective circuit element for determining the frequency of electromagnetic waves.

A further object of this invention is to provide a means of simultaneously measuring the frequency and analyzing the frequency spectrum of an electromagnetic wave.

A still further object of this invention is to provide a visual indication of the amplitude of the various frequency components of a complex wave.

Other objects, features, and advantages of this invention will suggest themselves to those skilled in the art and will become apparent from the following description of the invention taken in connection with the accompanying drawing in which.

Figure 1:
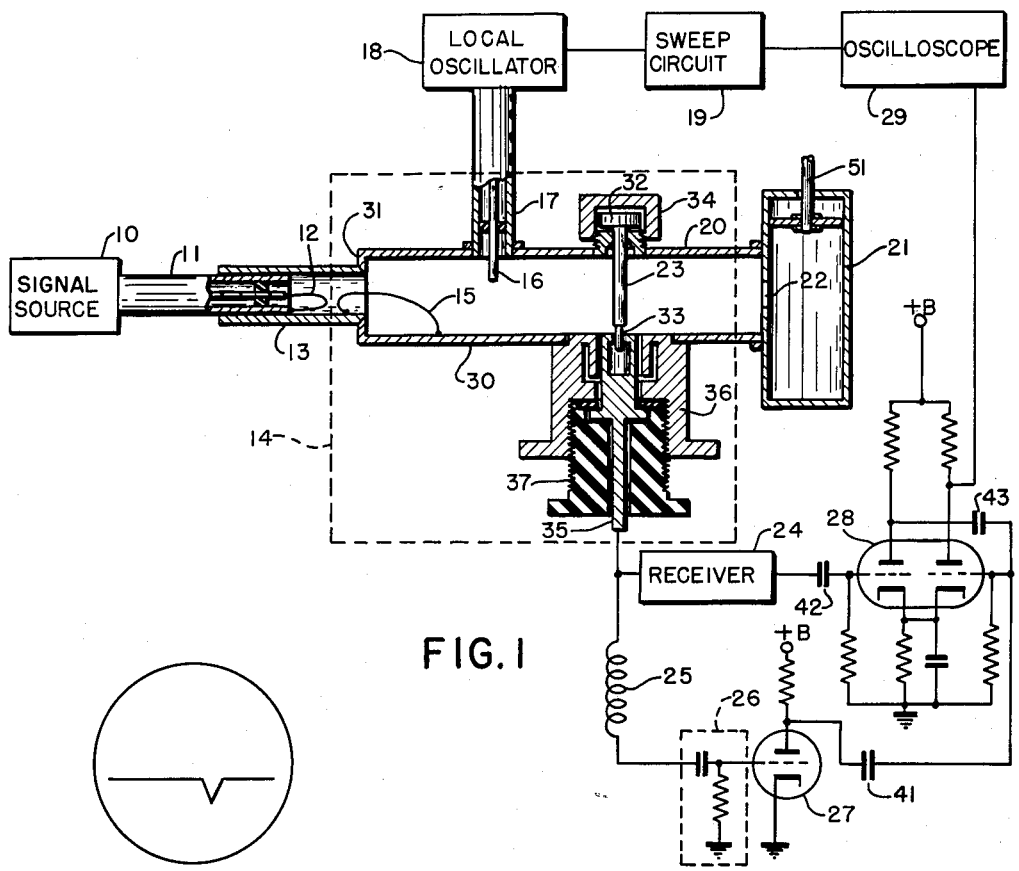
Fig. 1 is generally a block diagram of a system embodying the principles of the present invention.

Referring to the drawing and particularly to Fig. 1, there is indicated a signal source 10, which may be either an antenna or probe, feeding the termination coupling loop 12 of coaxial transmission line 11. The circular wave guide 13 is dimensioned to be beyond cut-off and thus serve as an attenuator of the signal introduced by coupling loop 12. Circular wave guide 13 slidably supports and encloses part of coaxial line 11. The R-F signal from signal source 10, normally comprising a series of short high frequency pulses, is coupled into mixer assembly 14 through the mutual inductance existing between termination loop 12 on the coaxial line and coupling loop 15 secured in wave guide 30. Wave guide 30 is preferably of rectangular cross-section and is terminated at the signal input end thereof by a metallic plate 31 which is centrally drilled out to secure the circular guide 13 previously described.

Probe 16, an extension of the center conductor of coaxial transmission line 17, couples the signal from local oscillator 18, the frequency of which may be periodically varied by sweep circuit 19, into the wave guide 30 of mixer assembly 14. Reactance tuning element 20 is an extension of wave guide 30 and connects mixer assembly 14 and calibrated, tunable high-Q cavity 21, excitation being accomplished through iris 22.

As is illustrated in Fig. 1, a crystal cartridge 23, having conductive terminals 32 and 33 separated by an insulating member is secured within the wave guide 30. Thus terminal 32 is mechanically and conductively secured to the upper wall of wave guide 30 by a metal screw cap 34. A conducting rod 35 contacts crystal terminal 33 and is insulatedly supported within cylindrical metal member 36 by an insulating screw plug 37. The intermediate frequency signal developed by crystal 23 and the direct crystal current resulting from signal rectification flow from mixer assembly 14 through crystal mixer 23 to receiver 24 and choke 25. From choke 25 the direct component of crystal current is peaked in differentiating circuit 26 and fed to a grid of amplifier 27, the output signal from the plate of which is coupled through capacitor 41 to the control grid of one triode amplifier section of double triode 28. The input signal to receiver 24 comprises a series of pulses at the intermediate frequency, the difference between the pulsed signal source frequency and the local oscillator frequency. The receiver 24 detects the input pulses to provide a video signal output which is connected to the other control grid of electron tube 28 through capacitor 42. The output of the left-hand triode section of tube 28 is as shown, coupled to the control grid of the right hand triode section through capacitor 43, and therefore the grid of the right hand tube is simultaneously energized by the output of amplifier 27 and the amplified receiver 24 output. The right hand section of double triode 28 thus sums up the two applied signals, which sum appears in the output plate circuit thereof, and is coupled to the vertical deflection plates of oscilloscope 29 whose horizontal deflection plates are fed from sweep circuit 19.

Figure 2:
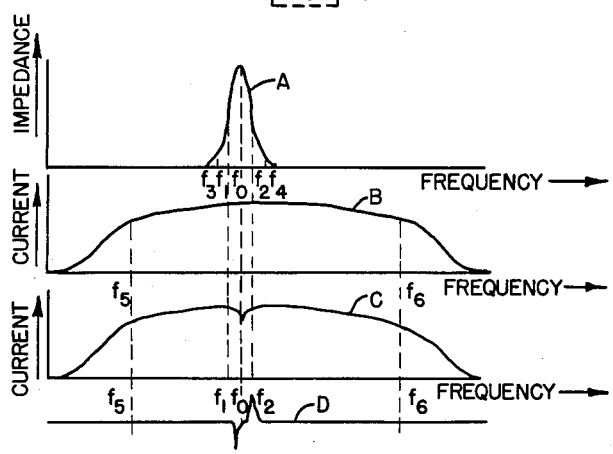
Fig. 2 is a series of wave forms depicting cavity resonance, crystal mixer current, effect of cavity resonance on crystal current, and the differentiated crystal current.

Reference is now made to Fig. 2 in which curve A is a plot of impedance versus frequency for a resonant cavity of the type illustrated by cavity 21. The figure of merit or Q of a resonant circuit or cavity as defined as:

$$Q = \frac{f_0}{f_2 - f_1}$$

when $f_0$ is the resonant frequency, and $f_1$ and $f_2$ are, in this case, the half impedance frequencies. It is to be noted that for frequencies within $$f_0 \pm \frac{f_0}{Q}$$

that is, from $f_1$ to $f_2$ the cavity impedance is a comparatively high value. For frequencies below $$f_0 - \frac{f_0}{Q}$$

and above $$f_0 + \frac{f_0}{Q}$$

such as $f_3$ and $f_4$, the cavity impedance is quite low. Advantage is taken of this cavity impedance change with frequency at iris 22 (Fig. 1) which changes the terminating impedance of reactance tuning element 20 and hence changes the impedance match of mixer assembly 14.

Mixer assembly 14 is inherently a broad band circuit element while cavity 21, on the other hand, is a narrow band selective circuit element. Curve B indicates that the direct rectified component of crystal current is substantially independent of frequency so long as the mixer assembly 14 (Fig. 1) is properly matched, as when cavity 21 impedance is low. If, however, a mismatch is created for a narrow band of frequencies, such as from $f_1$ to $f_2$ when cavity 21 impedance is high, the direct crystal current follows a pattern as indicated by curve C. Differentiation of curve C removes the gradual slopes and enhances the sharp portions of the curve. This is indicated by curve D and is the waveform of the input to amplifier 27.

Figure 3:
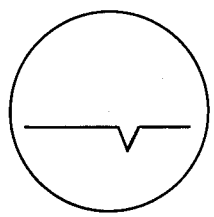
Fig. 3 shows a typical pattern obtained on the indicator when cavity resonance is within the range over which the receiver is being tuned and no R-F signal is being received.
Figure 4:
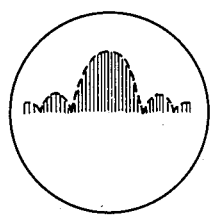
Fig. 4 shows a typical frequency spectrum obtained on the indicator when the cavity resonance is not within the range over which the receiver is being tuned.
Figure 5:
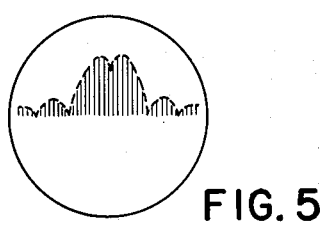
Fig. 5 shows a typical frequency spectrum and cavity resonance indication when cavity resonance is properly tuned for indicating the frequency of the electromagnetic wave.

When the apparatus of Fig. 1 is in operation, the local oscillator 18 is repeatedly sweeping through a range of frequencies, so chosen that if an R-F signal, either continuous or pulsed, whose frequency is between, say, $f_5$ and $f_6$ (Fig. 2), is received it will combine to produce the fixed receiver intermediate frequency sometime during the sweep. Pulsed signal input from source 10 will cause a pattern as shown in Fig. 4 to appear on the screen of oscilloscope 29. If the length of wave guide reactance tuning element 20 has been made such that mixer assembly 14 is matched when cavity 21 is not tuned to local oscillator 18 frequency, the direct crystal current will decrease due to mixer mismatch when the local oscillator 18 sweeps through the cavity resonance frequency. This dip of crystal current causes the pattern on the indicator to appear as is shown in Fig. 3 when there is no signal being applied by source 10. Changing the cavity resonance frequency by the tuning plunger and piston 51 moves the dip in the curve of Fig. 5 along the frequency spectrum.

Thus, the high-Q cavity is used to indicate visually instantaneous local oscillator frequency. It is therefore obvious that the frequency of the R-F signal from source 10 is local oscillator frequency plus or minus receiver intermediate frequency. To determine whether to add or subtract, the local oscillator is tuned up or down in frequency until the same spectrum pattern is observed. If the second pattern occurs at a higher local oscillator frequency than that previously obtained (from the calibrated resonant cavity), then local oscillator frequency is added to the intermediate frequency. Conversely, if the second pattern is obtained at a lower local oscillator frequency, then the frequency of the R-F signal is equal to the local oscillator frequency minus the receiver intermediate frequency.

While there has been described what is at present considered to be the preferred embodiment of this invention, it will be obvious to those skilled in the art that various changes and modifications may be made therein without departing from the scope of the invention as set forth in the appended claims.

What is claimed is:

1. In combination, a local oscillator signal source, electrical sweep circuit means for periodically varying the frequency of oscillations of said local oscillator signal, a source of signal of frequency to be measured, a mixer assembly having output and input and connecting said signal sources, a resonant cavity, a reactance tuning element joining said mixer assembly and said resonant cavity, an indicator responsive to said mixer assembly output for indicating the instantaneous amplitude of the output of said mixer assembly, and said sweep circuit means being adapted to synchronize variations of said local oscillator signal source and the sweep of said indicator.

2. Apparatus for obtaining a frequency analysis of an electromagnetic oscillation comprising, a source of periodically varying frequency local oscillations, a mixer assembly having its input connected to said sources of oscillations and having an output, a frequency selective circuit element, a reactance tuning element connecting said frequency selective circuit to said mixer assembly, an intermediate frequency receiver connected to said mixer assembly output, a differentiating circuit connected to said mixer assembly output, means of adding the outputs of said receiver and said differentiating circuit, an oscilloscope responsive to said last-mentioned means for indicating visually the instantaneous frequency of said local oscillations, and a sweep circuit for synchronizing variations of said local oscillator frequency and the sweep of said oscilloscope.

3. Apparatus for obtaining the frequency analysis of an electromagnetic oscillation comprising, a mixer assembly having in input and an output, a tunable and calibrated resonant cavity, a reactance tuning element connecting said mixer assembly and said cavity, a source of periodically varying frequency local oscillations connected into the input of said mixer, a source of said electromagnetic oscillations for analysis connected into the input of said mixer, an intermediate frequency receiver connected to said mixer output, a differentiating circuit connected to said mixer output, means for adding the outputs of said receiver and said differentiating circuit, an oscilloscope connected to the output of said last-mentioned means and means for simultaneously varying the frequency of said local oscillator signal and sweep of said oscilloscope, thereby providing a visual indication of the frequency spectrum of said electromagnetic oscillations and a visual indication of the resonant frequency of said cavity.

4. In combination, a local oscillator signal source, electrical sweep circuit means of periodically varying the frequency of oscillations of said oscillator, a source of electromagnetic signal oscillation to be measured, a circular wave guide attenuator connecting to said source of signal to be measured, a crystal mixer assembly having an input connected to said attenuator and to said source of local oscillations and having an output, a highly selective resonant cavity, a reactance tuning element joining said mixer assembly and said cavity, an intermediate frequency receiver having an input connected to said mixer assembly output, a differentiating circuit having its input connected to said mixer output through a choke, an electron tube amplifier connected to said differentiating circuit, a second electron tube amplifier for combining output of said receiver and said differentiating circuit, an oscilloscope connected to the output of said second amplifier tube, and means for simultaneously varying said local oscillator signal frequency and sweep of said oscilloscope, thereby providing a visual indication of the instantaneous amplitude of the frequency components of said electromagnetic oscillation being measured and the instantaneous frequency of oscillations of said local oscillator.

5. A radio frequency spectrum analyzer monitor for signals of high frequency radio waves comprising a source of signals to be monitored, a variable frequency local oscillator, a crystal mixer responsive to said source and the output of said local oscillator for providing an intermediate frequency output, a tunable resonant cavity coupled through reactance tuning means to said crystal mixer, a differentiating circuit responsive to the output of said crystal mixer, a receiver responsive to the intermediate frequency output of said crystal mixer, means to combine additively the output of said receiver and said differentiating circuit, an oscilloscope responsive to said last-mentioned means for visually indicating the instantaneous frequency of monitored signal and said local oscillator, and a sweep circuit for synchronizing frequency variations of said local oscillator and the sweep of said oscilloscope.

6. A radio frequency spectrum analyzer monitor for signals of high frequency radio waves comprising a source of signals to be monitored, a source of periodically varying frequency local oscillations, a mixer assembly responsive to said sources and providing an intermediate frequency output, a calibrated resonant cavity, a reactance tuning element connecting said mixer assembly and said cavity, an indicator responsive to said mixer assembly output, control means for synchronizing said indicator with the frequency variations of said local oscillations, and means for varying the resonant frequency of said cavity.

References Cited in the file of this patent

UNITED STATES PATENTS 2,471,432     Jaggi  ------------------ May 31, 1949